March 24, 1953
C. G. ERICKSON
2,632,258
READING TRAINING DEVICE
Filed May 7, 1952
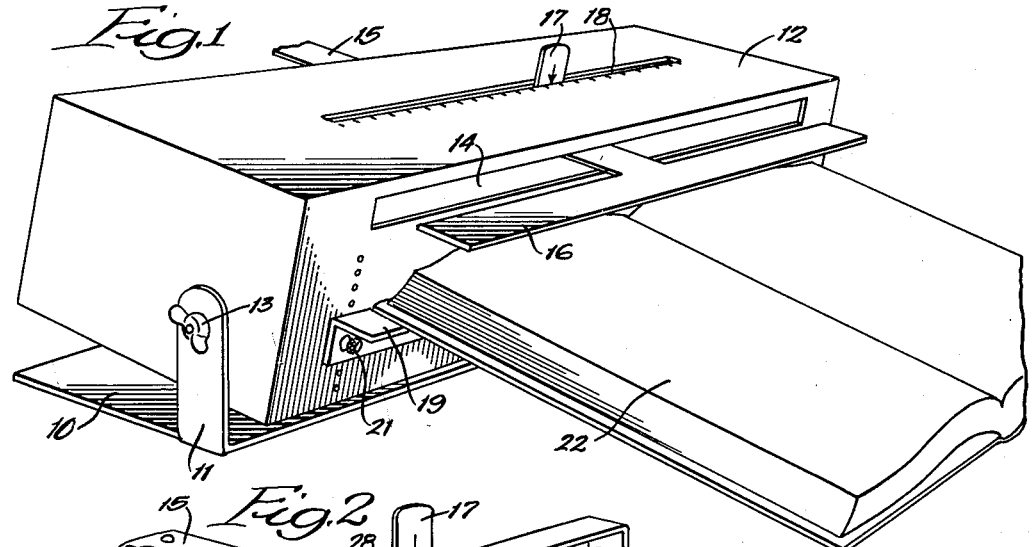
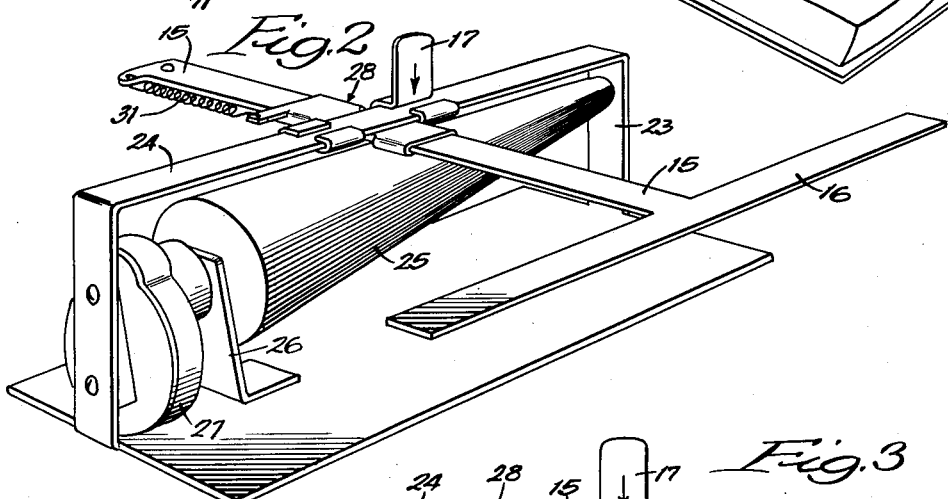
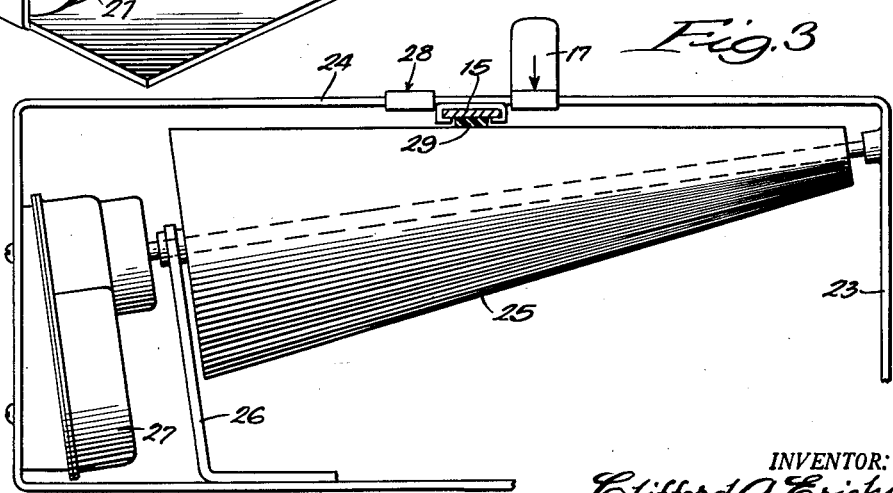
INVENTOR:
Clifford G. Erickson,
BY
E. S. Booth
ATTORNEY.

Patented Mar. 24, 1953

2,632,258

UNITED STATES PATENT OFFICE 2,632,258

READING TRAINING DEVICE

Clifford G. Erickson, Chicago, Ill.

Application May 7, 1952, Serial No. 286,580

9 Claims. (Cl. 35—35)

This invention relates to a reading training device, and more particularly to a device to force a student to read at a predetermined adjustable rate.

In reading training one of the most commonly used exercises is to force a student to read at a rate adjusted to the maximum of his ability and which is increased from time to time as his ability increases. For this purpose training devices have been provided which move a shutter over a page of reading material at a preset rate so that the student is forced to read at a rate equal to or greater than the rate of shutter movement. Such devices as heretofore constructed have been complicated and expensive and, in most cases, have been capable of use with only a single sheet of paper so that specially prepared sheets must be used.

It is one of the objects of the present invention to provide a reading training device which is extremely simple and inexpensive, which is capable of adjustment over a wide range for a wide range of reading rates, and which can be used with single sheets, books or other readily available material.

Another object is to provide a reading training device which moves a van over a sheet at an adjustable preset rate, and which is angularly adjustable to move the vane parallel and close to different types of reading material.

A further object is to provide a reading training device which uses a relatively small and inexpensive constant speed power device such as a synchronous electric clock motor.

According to one feature of the invention the major part of the power required is furnished by a spring and the power device functions primarily as a governor to maintain the speed constant.

The above and other objects and features of the invention will be more readily apparent from the following description taken in conjunction with the following drawing, in which Figure 1 is a perspective view of a reading device embodying the invention;

Figure 2 is a perspective view of the internal mechanism of the device with the housing removed, and Figure 3 is an elevation with parts in section.

The device as best shown in Figure 1, comprises a base plate 10 which may be supported on a table and which has at its ends upturned lugs 11 to support a rectangular housing 12. The housing 12 is pivoted on the lugs 11 for swinging movement about a horizontal axis and may be held in any desired adjusted position by wing nuts 13 or the like.

The housing is formed in its front wall near its top with an opening 14 through which an elongated bar 15 extends. At its outer end the bar 15 carries a vane 16 to be moved over a sheet of reading material. The rate of movement of the bar and vane can be adjusted by moving an adjusting finger 17 along a slot 18 in the top of the housing.

The front wall of the housing below the opening 14 carries a supporting bar 19 shown as an angle strip adjustably secured to the housing by removable fastenings 21. The supporting bar 19 lies under the vane 16 and is adapted to support reading material, such as a book 22, at a convenient reading angle. By adjusting the support 19 vertically to compensate for different thicknesses of reading material, the sheet to be read can be positioned closely beneath the vane 16 and by adjusting the angle of the housing 12 the vane can be caused to move parallel to the sheet. In this way the device can be used with books, single sheets or any other readily available material with the vane moving parallel and close to the reading material.

The mechanism for moving the bar 15 as shown in Figures 2 and 3, comprises a U-shaped frame 23 formed with a horizontal cross frame member 24 lying parallel to and beneath the top of the housing 12. The U-shaped frame member supports a conically tapered roller 25 which is mounted with its axis at an angle to the horizontal so that its upper surface lies beneath and parallel to the frame member 24. The roller is supported at its large end in a bearing bracket 26 and is connected to a constant speed driving means such as a synchronous clock motor 27.

A carriage indicated generally at 28 is slidably mounted on the frame member 24 and carries the adjusting finger 17 as shown. The carriage may conveniently be formed of sheet metal which is cut and folded to provide channels fitting slidably over the frame member 24 and cross channels at a right angle thereto which slidably supports the bar 15 for movement at a right angle to the frame member 24 and the roller. As best seen in Figure 3, the bar 15 carries a strip 29 of friction material which engages the top surface of the roller so that as the roller turns the bar will be moved. Preferably the strip 29 which may be of rubber or the like, terminates short of the ends of the bar so that the bar will not tend to be moved completely out of the carriage by the roller.

In order to relieve the load on the motor 27 so that a relatively small motor may be used, a spring 31 is connected to ears on the carriage 28 and on the back end of the bar 15. Preferably a low rate tension spring is employed which tends to advance the bar in a direction to move the vane over a sheet of reading material and the strength of the spring is selected to compensate for the friction involved without exerting any appreciable force on the bar. In this way, the spring furnishes the major part of the power required to move the bar and the motor functions primarily as a speed governor to hold the speed of the roller constant. It is noted that even if the spring force is greater than that required to move the bar, the motor can still function effectively to limit the speed of the roller so that under all conditions the roller speed will be constant.

To use the device reading material is placed on the support 19 and the angle of the housing is adjusted to cause the vane 16 to move parallel to the reading material. The bar 16 is then forced back manually toward the housing as shown in Figure 1, and during this movement the spring 31 is stretched. When the vane is released the spring tends to move to forward and the speed of movement is controlled by the motor 27 and by the longitudinal position of the carriage relative to the roller. By setting the carriage through the adjusting finger 17 any desired rate of movement of the vane can be obtained to correspond to the student's abilities.

While one embodiment of the invention has been shown and described in detail, it will be understood that this is illustrative only and is not to be taken as the scope of the invention, reference being had for this purpose to the appended claims.

What is claimed is:

1. A reading training device comprising an elongated conically tapered roller, means for driving the roller at a substantially constant speed, a frame including an elongated beam lying parallel to and spaced from the surface of the roller, a carriage mounted on the beam for sliding adjustment therealong, an elongated bar carried by the carriage for sliding movement transverse to the bar and the roller, a friction surface on the bar engaging the surface of the roller whereby the rate of movement of the bar will be determined by the speed of the roller and the position of the carriage relative thereto, and a vane carried by the bar to be moved thereby over a page of reading material as the bar moves.

2. A reading training device comprising an elongated conically tapered roller, means for driving the roller at a substantially constant speed, a frame including an elongated beam lying parallel to and spaced from the surface of the roller, a carriage mounted on the beam for sliding adjustment therealong, an elongated bar carried by the carriage for sliding movement transverse to the bar and the roller, a friction surface on the bar engaging the surface of the roller whereby the rate of movement of the bar will be determined by the speed of the roller and the position of the carriage relative thereto, a spring connecting the bar and the carriage urging the bar in one direction relative to the carriage, and a vane carried by the bar to be moved thereby over a page of reading material as the bar moves in said one direction.

3. The construction of claim 2 in which the first named means is an electric synchronous motor.

4. A reading training device comprising a housing having an opening in one side thereof near the top, an elongated conically tapered roller in the housing with its upper surface parallel to and spaced from the top of the housing, a carriage slidably mounted in the top part of the housing for sliding movement parallel to the top of the roller, an elongated bar slidably carried by the carriage for sliding movement transverse to the roller, a friction surface on the bar frictionally engaging the top surface of the roller, means for driving the roller at a substantially constant speed, the bar projecting through said opening in the housing, and a vane carried by the projecting end of the bar to move over a page of reading material as the bar moves.

5. A reading training device comprising a housing having an opening in one side thereof near the top, an elongated conically tapered roller in the housing with its upper surface parallel to and spaced from the top of the housing, a carriage slidably mounted in the top part of the housing for sliding movement parallel to the top of the roller, an elongated bar slidably carried by the carriage for sliding movement transverse to the roller, a friction surface on the bar frictionally engaging the top surface of the roller, means for driving the roller at a substantially constant speed, the bar projecting through said opening in the housing, a vane carried by the projecting end of the bar to move over a page of reading material as the bar moves, and a support on said one side of the housing beneath the opening therein to support reading material beneath the vane.

6. A reading training device comprising a housing having an opening in one side thereof near the top, an elongated conically tapered roller in the housing with its upper surface parallel to and spaced from the top of the housing, a carriage slidably mounted in the top part of the housing for sliding movement parallel to the top of the roller, an elongated bar slidably carried by the carriage for sliding movement transverse to the roller, a friction surface on the bar frictionally engaging the top surface of the roller, the bar projecting through said opening in the housing, a vane carried by the projecting end of the bar to move over a page of reading material as the bar moves, a spring connected to the bar urging it in a direction to move the vane away from the housing over the reading material, and a constant speed device connected to the roller to maintain its speed substantially constant.

7. The construction of claim 6 in which the constant speed device is a synchronous electric motor.

8. A reading training device comprising a housing having an opening in one side thereof near the top, an elongated conically tapered roller in the housing with its upper surface parallel to and spaced from the top of the housing, a carriage slidably mounted in the top part of the housing for sliding movement parallel to the top of the roller, an elongated bar slidably carried by the carriage for sliding movement transverse to the roller, a friction surface on the bar frictionally engaging the top surface of the roller, means for driving the roller at a substantially constant speed, the bar projecting through said opening in the housing, a vane carried by the projecting end of the bar to move over a page of reading material as the bar moves, a base for supporting the housing, and means pivotally mounting the housing on the base on a horizontal axis transverse to the bar.

9. A reading training device comprising a housing having an opening in one side thereof near the top, an elongated conically tapered roller in the housing with its upper surface parallel to and spaced from the top of the housing, a carriage slidably mounted in the top part of the housing for sliding movement parallel to the top of the roller, an elongated bar slidably carried by the carriage for sliding movement transverse to the roller, a friction surface on the bar frictionally engaging the top surface of the roller, means for driving the roller at a substantially constant speed, the bar projecting through said opening in the housing, a vane carried by the projecting end of the bar to move over a page of reading material as the bar moves, a base for supporting the housing, means pivotally mounting the housing on the base on a horizontal axis transverse to the bar, and a support vertically adjustable on said one side of the housing beneath the opening therein to support reading material beneath the vane.

CLIFFORD G. ERICKSON.

REFERENCES CITED

The following references are of record in the file of this patent:

UNITED STATES PATENTS

| Number | Name | Date |
| --- | --- | --- |
| 2,265,924 | Oerter et al. | Dec. 9, 1941 |
| 2,568,577 | Alexander | Sept. 18, 1951 |
| 2,605,558 | Lehner et al. | Aug. 5, 1952 |